United States Patent [19]

Cudaback et al.

[11] Patent Number: 5,078,877
[45] Date of Patent: Jan. 7, 1992

[54] DUAL FLOW AND DUAL STAGE LUBRICANT FILTER ASSEMBLY

[75] Inventors: Roger L. Cudaback, Gibbon; Kenton L. Jorgenson, Kearney, both of Nebr.

[73] Assignee: Baldwin Filters, Inc., Kearney, Nebr.

[21] Appl. No.: 411,700

[22] Filed: Sep. 25, 1989

[51] Int. Cl.$^5$ ............................................. B01D 27/14
[52] U.S. Cl. ............................. 210/315; 210/342; 210/440; 210/444; 210/450; 210/456; 210/484; 210/489; 210/493.2; 210/497.01; 210/DIG. 13; 210/DIG. 17
[58] Field of Search ............... 210/315, 337, 338, 342, 210/433.1, 437, 438, 444, 445, 450, 456, 458, 484, 487, DIG. 13, DIG. 17, 488, 489, 493.1, 493.2

[56] References Cited

U.S. PATENT DOCUMENTS

| | | | |
|---|---|---|---|
| 2,271,054 | 1/1942 | Williams | 210/DIG. 13 |
| 2,902,162 | 9/1959 | Humbert, Jr. et al. | 210/438 |
| 2,929,506 | 3/1960 | Belgarde | 210/315 |
| 3,232,437 | 2/1966 | Hultgren | 210/445 |
| 3,269,541 | 8/1966 | Neely | 210/315 |
| 3,388,802 | 6/1968 | Wilkinson | 210/342 |
| 3,586,171 | 6/1971 | Offer | 210/136 |
| 4,738,776 | 4/1988 | Brown | 210/168 |

FOREIGN PATENT DOCUMENTS

| | | | |
|---|---|---|---|
| 1378414 | 10/1964 | France | 210/315 |
| 636164 | 3/1962 | Italy | 210/489 |
| 13489 | 3/1981 | Japan | 210/338 |

OTHER PUBLICATIONS

Fram Catalog Page 469, Dated Prior to Sep. 25, 1988.
Baldwin Drawing No. P.V. 706-M, Dated 1/8/64.

*Primary Examiner*—Robert A. Dawson
*Assistant Examiner*—Matthew O. Savage
*Attorney, Agent, or Firm*—Leydig, Voit & Mayer

[57] ABSTRACT

A filter assembly for an internal combustion engine includes inner and outer coaxial filter elements disposed in a spin-on canister which is detachably secured to a mounting adaptor. Oil from the crankcase is filtered by the outer filter element and a substantial volume of the filtered oil flows to the primary lubricating circuit of the engine. A small percentage of the filtered oil is subjected to further filtration by the inner filter element and is returned directly to the crankcase. A tubular fitting extends between end caps on the two coaxial filter elements to establish communication between the inner filter and the mounting adaptor, to separate the two flow circuits, and to maintain a fixed axial spacing between the two filter elements.

9 Claims, 2 Drawing Sheets

DUAL FLOW AND DUAL STAGE LUBRICANT FILTER ASSEMBLY

BACKGROUND OF THE INVENTION

This invention relates to a lubricating oil filter assembly of the type used on internal combustion engines. More specifically, the invention relates to a filter assembly having a spin-on or throwaway type filter cartridge adapted to be secured to a mounting adaptor on an engine having two lubricating oil circuits.

Early prior art generally utilized a separate filter assembly for each lubricating oil circuit of the engine. Succeeding art combined two filter elements into one filter assembly in order to reduce maintenance, service and inventory. Filter assemblies of this type are disclosed in Offer U.S. Pat. No. 3,586,171 and Brown U.S. Pat. No. 4,738,776.

The offer patent discloses a spin-on filter with two filter elements in an axially stacked arrangement. One of the filter elements is a relatively short section having a coarse filter medium which is commonly referred to as a depth-type media. The other filter element is longer and utilizes a finer filter medium which is the typical pleated paper or surface-type media. The shorter, coarser filter element is closest to the inlet/outlet positions on the mounting adaptor while the longer, fine-media filter element is positioned at the farther end of the spin-on cartridge. A cylindrical hollow stem is located in the center of the outlet opening of the adaptor and is sealably engaged by a rubber seal on the longer filter element. This separates the flow of lubricating oil to the two circuits.

The Brown patent also discloses a filter assembly with two distinct filter elements arranged as a stack, one on top of the other. In this case, however, the shorter of the two elements contains the finer filter medium which is defined by a plurality of stacked disks. The longer section contains a coarser filter medium which is formed by a pleated paper arrangement. This section is located closer to the inlet/outlet positions on the mounting adaptor. Separation of oil flow from the two sections is established by a cylindrical, hollow core located in the longer section. The core provides a seal where the two sections abut and, at the opposite end of the longer section, a rubber seal suitably communicates with the core. The seal also communicates with and engages a protuberance of the mounting adaptor in order to effect separation of lubricating oil flow for the two oil circuits.

While combined filter assemblies of the type disclosed in the Offer and Brown patents reduce service and inventory requirements, sacrifices have been made in many areas. A combined filter assembly is more complex and costly than an individual filter assembly with one filter element and one oil flow path. The combined filter must function in an environment serving two oil circuits operating at independent and usually different pressures with a resulting difference in the pressure differential. The structure required for separation of the circuits accounts for the complexity and a major portion of the added cost.

The size of the combined filter assembly often is approximately the same as that of an individual assembly. The manufacturer must provide for additional contaminant capacity in the combined filter in order to avoid a sacrifice in service life or change interval.

SUMMARY OF THE INVENTION

The general aim of the present invention is to reduce the sacrifices that currently result when two filter elements of approximately the same relative size are combined into one filter assembly that must serve two separate lubricating oil circuits on an application such as an internal combustion engine.

It is a further object of the invention to provide a combined filter assembly which, when compared with prior assemblies of the same general type, is less complex with fewer parts and thus is less costly while maintaining internal separation of oil paths for the two lubricating oil circuits.

Another object is to provide optimum filtration capacity that will yield increased service life for the filter elements of the assembly.

A still further object of the present invention is to arrange the filtering media in a manner that allows progressively finer filtration in order to attain optimum efficiency while increasing the capacity of the combined filter assembly.

In a more detailed sense, the invention resides in the provision of a combined filter assembly in which the two filter elements are telescoped in coaxial relation with one another and in which a tubular fitting extends through end caps of the filter elements and connects with the adaptor in order to discharge oil through one of the circuits while keeping such oil separated from the oil of the other circuit.

These and other objects and advantages of the invention will become more apparent from the following detailed description when taken in conjunction with the accompanying drawings.

DETAILED DESCRIPTION OF THE PREFERRED EMBODIMENT

Figure 1:
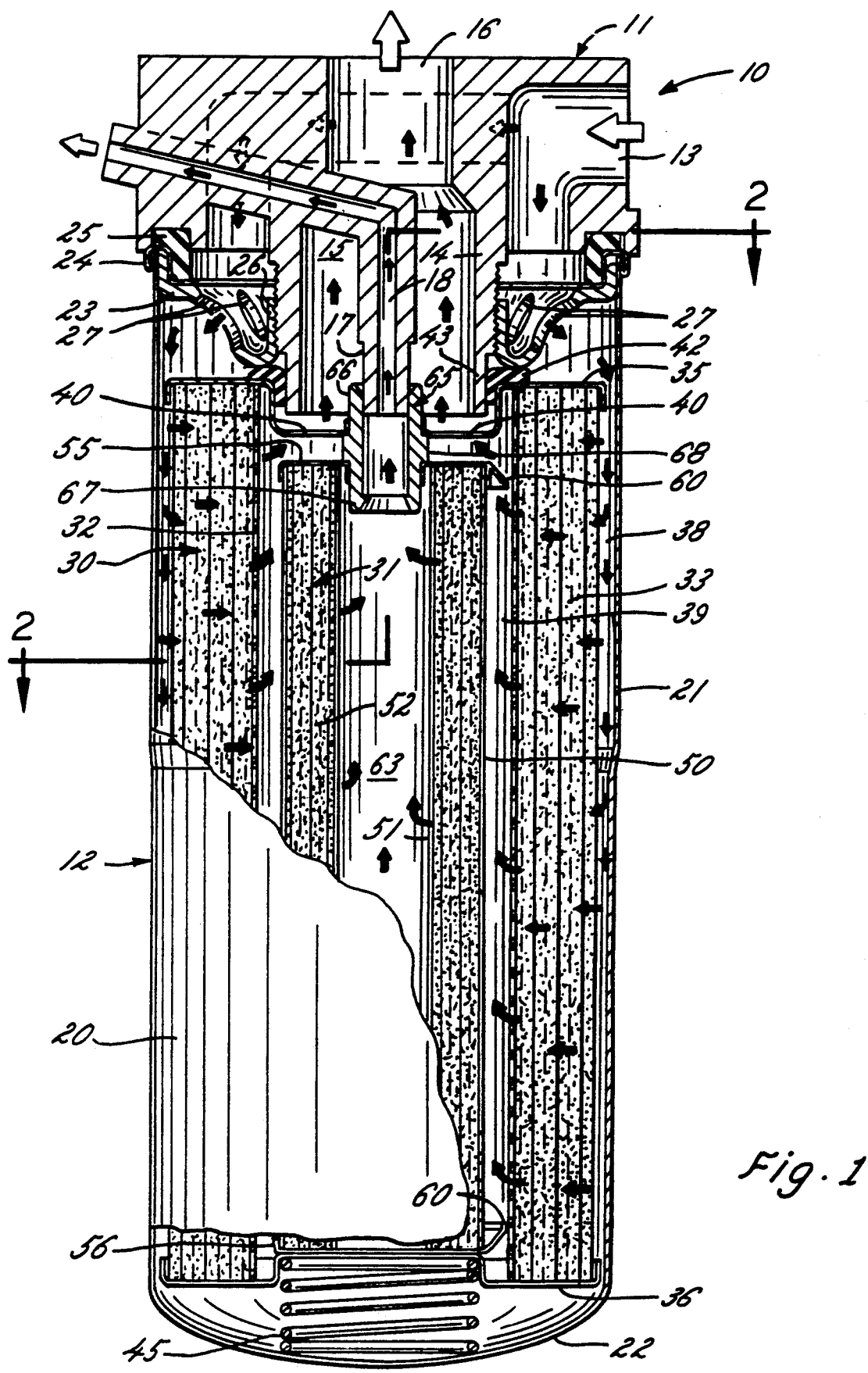
FIG. 1 is a cross-sectional view taken axially through a new and improved filter assembly incorporating the unique features of the present invention.
Figure 2:
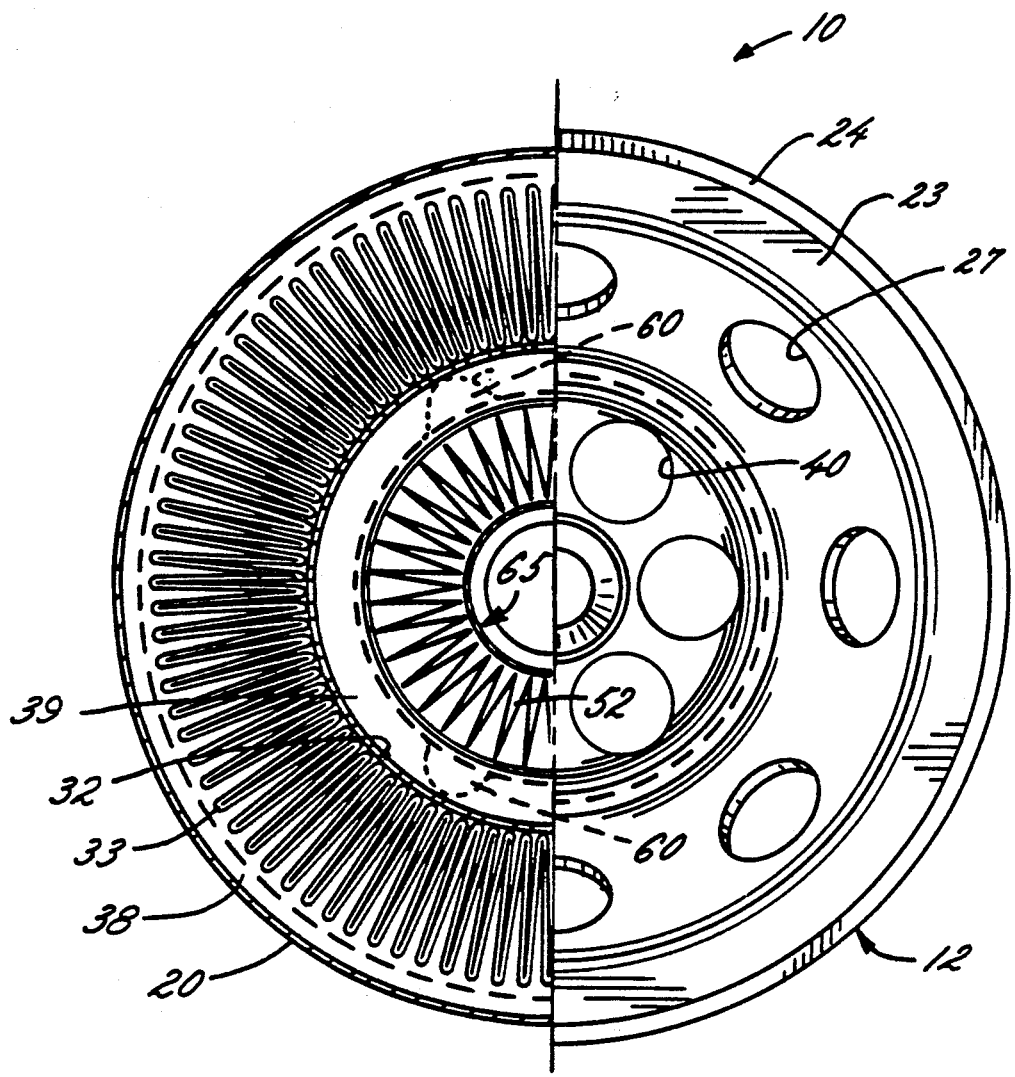
FIG. 2 is an enlarged cross-section taken substantially along the line 2—2 of FIG. 1.

For purposes of illustration, the invention has been shown in the drawings as incorporated in an oil filter assembly 10 of the type used on an internal combustion engine. The filter assembly of the present invention is particularly adapted for use with an engine having two separate lubricating oil circuits. By way of example, oil from the crankcase may be filtered and then a substantial percentage of such oil may flow through a primary circuit to the engine bearings. A substantially smaller percentage of the filtered oil may be subjected to a second stage of filtration to remove fines and then may be returned directly to the crankcase.

In general, the filter assembly 10 comprises two primary components, namely, (A) a mounting adaptor 11 which is attached permanently to the engine and (B) a spin-on, throwaway cartridge 12 which is adapted to be secured releasably to the adaptor. The adaptor includes an inlet 13 for receiving contaminated oil from the crankcase and for introducing such oil into the cartridge. Formed integrally with and depending from the adaptor is an externally threaded neck 14 which is tubular and which defines an outlet 15 that communicates with an outlet port 16 for discharging oil in one of the circuits to the bearings of the engine. Coaxial with and located within the neck 14 is a conduit or stem 17 which defines an outlet 18 for the oil of the other lubricating oil circuit.

The cartridge 12 includes a deep canister 20 made of sheet metal and having a cylindrical side wall 21 and a domed end wall 22 integral with one end of the side wall. The opposite end of the canister is open when the canister is formed but is adapted to be closed by a separate end plate 23 which is held in assembled relation with the canister by means of an annular sheet metal retainer 24. A resiliently yieldable ring 25 is captivated by the retainer and seals against the adaptor 11 when the cartridge 12 is attached to the adaptor. To effect such attachment, the end plate 23 is formed with an internally threaded collar 26 which is adapted to be screwed onto the neck 14.

Several angularly spaced inlet openings 27 are formed through the end plate 23. The inlet openings communicate with the inlet 13 of the adaptor 11 and deliver contaminated oil into the canister 20.

In accordance with the present invention, two filter elements 30 and 31 are uniquely located in compact coaxial relation within the canister 20. The filter element 30 serves to clean the oil flowing to the engine bearings while the filter element 31 effects more complete filtration of the oil flowing directly to the crankcase. As will become more apparent subsequently, the two filter elements are uniquely arranged to allow filtered oil to flow to the two circuits while isolating each circuit from the other.

More specifically, the filter element 30 constitutes the outermost element and is of tubular construction. The filter element 30 consists of an inner perforated core 32 which supports a suitable and relative coarse filter media such as pleated paper. End caps 35 and 36 are located at the ends of the filter media and captivate the media against the core.

The outer side of the filter media 33 of the element 30 is spaced inwardly from the inner side of the canister 20 and coacts therewith to define an annular chamber 38. Oil in the chamber flows radially through the media 33 and is cleaned thereby before flowing through the core 32 and into a chamber 39 defined by the interior of the tubular filter element 30. A substantial volume of the filtered oil is discharged from the chamber 39 by way of angularly spaced outlet openings 40 formed in the end cap 35. Such oil flows through the outlet 15 of the adaptor 11 to the outlet port 16 and then to the engine bearings.

A resiliently yieldable sealing ring 42 prevents dirty oil at the inlet openings 27 from flowing directly into the chamber 39 and forces such oil to flow through the filter media 33 to reach the chamber 39. The ring 42 includes a radially extending portion which is sandwiched between the end plate 24 and the end cap 35 and further includes an axially extending portion which is adapted to contract around an extension 43 of the threaded neck 14. A coil spring 45 is located in the canister 20 between the closed end 22 thereof and the end cap 36 of the filter element 30 and urges the end cap 35 against the sealing ring 42 so as to compress the latter between the end cap 35 and the end plate 23.

In keeping with the invention, the filter element 31 is located in the chamber 39 and is coaxial with the filter element 30. The filter element 31 includes an outer wrapper 50, a perforated inner core 51 and a relatively fine pleated paper filter media 52 located between the wrapper and the core. These components are sandwiched between a pair of end caps 55 and 56 which captivate the filter media 52 against the core 51. The end cap 56 engages the inner side of the end cap 36 while the end cap 55 is spaced axially from the end cap 35. While the outer wrapper 50 could be perforated along its entire length, it preferably is perforated only over about a one inch length at its end portion located adjacent the spring 45.

The outer diameter of the inner filter element 31 is considerably less than the inner diameter of the outer filter element 30 and thus the presence of the filter element 31 causes the chamber 39 to be of annular configuration. Angularly spaced and radially outwardly projecting tabs 60 are formed on the end caps 55 and 56 and lightly engage the core 32 of the outer filter element 30 to help keep the inner filter element 31 in centered relation with respect to the outer filter element.

Some of the filtered oil in the chamber 39 flows radially through the filter media 52 of the inner filter element 31 and flows to a chamber 63 defined by the interior of the inner filter element. Pursuant to the invention, a tubular fitting 65 communicates with the chamber 63 and directs such oil to the adaptor 11 while keeping the oil separated from the oil flowing through the outlet openings 40 from the chamber 39. In this instance, the fitting is made of soft, flexible rubber-like material and is formed with end portions 66 and 67 which are sealably telescoped into openings formed in the end caps 35 and 55, respectively. An enlarged collar 68 is formed around the fitting between the end portions and is sandwiched between the end caps 35 and 55 in order to establish a fixed axial spacing between the filter elements 30 and 31. When the cartridge 12 is attached to the adaptor 11, the tubular end portion 66 telescopes over and seals against the stem 17 so as to establish communication between the interior chamber 63 of the filter element 31 and the outlet 18 of the adaptor.

With the foregoing arrangement, dirty oil from the inlet 13 flows through the inlet openings 27 in the end plate 23 and into the canister 20. The end plate 23, the end cap 35, the sealing ring 42 and the extention 43 coact to prevent the dirty oil from flowing directly to the interior chamber 39 of the filter element 30 and force the oil to flow to the outer chamber 38 for subsequent radial flow through the filter media 33 to the chamber 39. Most of the oil in the chamber 39 flows to the adaptor 11 via the outlet openings 40 and is prevented by the end cap 55 and the tubular fitting 65 from flowing directly to the interior chamber 63 of the filter element 31. The remaining oil in the chamber 39 flows radially through the relatively fine filter media 52 of the filter element 31 for removal of additional contaminants. The clean oil then is discharged from the chamber 63 via the fitting 65 and flows to the outlet 18 of the adaptor 11.

Because the outer wrapper 50 of the inner filter element 31 is perforated over only a relatively short length adjacent one end portion of the element, oil flowing to the filter element from the chamber 39 is limited and is forced to flow axially through a substantial length of the filter media 52 thereby to effect optimum filtering. In addition, the unperforated portion of the wrapper 50 acts as a deflector to prevent the high volume of oil flow exiting the filter element 30 from dislodging the contaminants that settle in the filter media 52.

From the foregoing, it will be apparent that the present invention brings to the art a new and improved filter assembly 10 with filter elements 30 and 31 which are coaxial with one another so as to provide an axially compact assembly with relatively high filtering capacity. The assembly requires only a few relatively simple parts and thus is comparatively low in cost.

We claim:

1. An oil filter cartridge comprising a canister having an open end and an opposite closed end, an end plate on the open end of said canister, inlet ports in said end plate for admitting oil into said canister, a first tubular filter disposed in said canister in radially spaced relation therewith whereby oil in said canister may flow radially through said filter to the interior thereof, a first end cap on one end of said first filter and isolating the interior thereof from direct communication with said inlet ports, outlet ports in said first end cap for permitting oil in the interior of said filter to flow out of said canister, a second tubular filter telescoped into and coaxial with said first filter and located in radially spaced relation with said first filter whereby oil in the interior of said first filter also may flow radially through said second filter to the interior thereof, a second end cap on one end of said second filter and isolating the interior thereof from direct communication with the interior of said first filter, and a tubular fitting extending through and sealed to said first and second end caps and communicating with the interior of said second filter to discharge oil therefrom for flow out of said canister while coacting with said second end cap to isolate the interior of said second filter from direct communication with the interior of said second filter from direct communication with the interior of said first filter, said fitting being a one-piece member having integral first and second tubular portions telescoped into said first and second end caps, respectively, and said fitting having an enlarged collar integral with an located between said first and second tubular portions and sandwiched between said end caps to establish a predetermined axial spacing between the end caps.

2. A spin-on oil filter as defined in claim 1 in which said fitting is made of resiliently yieldable material and sealingly engages said end caps.

3. A spin-on filter as defined in claim 1 further including means on said second end cap and engageable with said first filter to help keep said second filter substantially centered within said first filter.

4. A spin-on oil filter as defined in claim 1 further including a third end cap on a second and opposite end of said second filter, and means on said second and third end caps for engagement with said first filter to help keep said second filter centered within said first filter.

5. A spin-on oil filter as defined in claim 4 in which said means on said second and third end caps comprise angularly spaced tabs extending radially outwardly from said second and third end caps.

6. An oil filter cartridge as defined in claim 1 in which said second filter comprises an inner core and an outer wrapper and further comprises filter media located between said core and said wrapper, said outer wrapper being perforated only along a relatively short length thereof located adjacent the end of said second filter remote from said second end cap.

7. An oil filter assembly comprising an adaptor and further comprising a spin-on cartridge attached releasably to said adaptor, said adaptor having an externally threaded neck defining a first outlet and having a conduit disposed within and coaxial with said neck and defining a second outlet, said adaptor also having an inlet for introducing oil to said cartridge, said cartridge comprising a canister having an open end and an opposite closed end, an end plate on the open end of said canister and having an internally threaded opening receiving said neck and detachably securing said canister to said adaptor, inlet openings in said end plate for admitting oil from said inlet into said canister, a first tubular filter disposed in said canister in radially spaced relation therewith, a second tubular filter telescoped into and coaxial with said first filter and located in radially spaced relation with said first filter, there being an annular flow chamber between said first and second filters, a first end cap on said first filter and preventing oil from said inlet openings from flowing directly into the interior of said first filter whereby such oil is forced to flow through said first filter to the interior thereof and into said flow chamber, outlet openings in said first end cap and communicating with said first outlet in said neck to permit oil in said flow chamber to flow to said first outlet, means sandwiched between said end plate and said first end cap and encircling said neck to seal said first outlet and said outlet openings from said inlet openings, a second end cap on one end of said second filter and preventing oil from said flow chamber from flowing directly to the interior of said second filter whereby such oil is forced to flow through said second filter to the interior thereof, and a tubular fitting extending between said second end cap and said conduit and communicating with the interior of said second filter to discharge oil therefrom to said second outlet, said second filter comprising an inner ore and an outer wrapper and further comprising filter media located between said core and said wrapper, said outer wrapper being perforated only along a relatively short length thereof located adjacent the end of said second filter remote from said second end cap whereby oil in said flow chamber is forced to flow through said second filter in the region of said short length and is prevented from flowing through said second filter in the region of the remaining length of the outer wrapper and dislodging contaminants in the filter media adjacent such remaining length.

8. An oil filter cartridge comprising a canister having an open end and an opposite closed end, an end plate on the open end of said canister, a first tubular filter disposed in said canister in radially spaced relation therewith, a second tubular filter telescoped into and coaxial with said first filter and located in radially spaced relation with said first filter, there being an annular flow chamber between said first and second filters, inlet means for admitting oil into said canister, a first end cap on said first filter and preventing oil from said inlet means frog flowing directly into the interior of said first filter whereby such oil is forced to flow through said first filter to the interior thereof and into said flow chamber, first outlet means in said first end cap for permitting oil in said flow chamber to flow out of said canister, means between said end plate and said first end cap for sealing said first outlet means and from said inlet means, a second end cap on one end of said second filter and preventing oil in said flow chamber from flowing directly to the interior of said second filter whereby such oil is forced to flow through said second filter to the interior thereof, said second filter comprising an inner core and an outer wrapper and further comprising filter media located between said core and said wrapper, said outer wrapper being perforated only along a relatively short length thereof located adjacent the end of said second filter remote from said second end cap whereby oil in said flow chamber is forced to flow through said second filter in the region of said short length and is prevented from flowing through said second filter in the region of the remaining length of the outer wrapper and dislodging contaminants in said filter media adjacent such remaining length, and second outlet means in said second end cap and communicating with the interior of said second filter to discharge oil therefrom for flow out of said canister.

9. An oil filter assembly comprising an adaptor and further comprising a spin-on cartridge attached releasably to said adaptor, said adaptor having an externally threaded neck defining a first outlet and having a conduit disposed within the coaxial with said neck and defining a second outlet, said adaptor also having an inlet for introducing oil to said cartridge, said cartridge comprising a canister having an open end and an opposite closed end, an end plate on the open end of said canister and having an internally threaded opening receiving said neck and detachably securing said canister to said adaptor, inlet openings in said end plate for admitting oil from said inlet into said canister, a first tubular filter disposed in said canister in radially spaced relation therewith, a second tubular filter telescoped into and coaxial with said first filter and located in radially spaced relation with said first filter, a first end cap on said first filter and preventing oil from said inlet openings from flowing directly into the interior of said first filter whereby such oil is forced to flow through said first filter to the interior thereof, outlet openings in said first end cap and communicating with said first outlet in said neck to permit oil in the interior of said first filter to flow to said first outlet, means sandwiched between said end plate and said first end cap and encircling said neck to seal said first outlet and said outlet openings from aid inlet openings, a second end cap on one end of said second filter and preventing oil from the interior of said first filter from flowing directly to the interior of said second filter whereby such oil is forced to flow through said second filter to the interior thereof, and a tubular fitting extending between said second end cap and said conduit and communicating with the interior of said second filter to discharge oil therefrom to said second outlet, said fitting extending through and being sealed to said first and second end caps to isolate the interior of said second filter from direct communication with the interior of said first filter, said fitting being a one-piece member having integral first and second tubular portions telescoped into said first and second end caps, respectively, and said fitting having an enlarged collar integral with and located between said first and second tubular portions and sandwiched between said end caps to establish a predetermined axial spacing between the end caps.

* * * * *